United States Patent
Weiss

(10) Patent No.: US 9,613,282 B2
(45) Date of Patent: Apr. 4, 2017

(54) BIOMETRIC METHODS AND SYSTEMS FOR ENROLLMENT AND AUTHENTICATION

(71) Applicant: Golan Weiss, Moshav Hodaya (IL)

(72) Inventor: Golan Weiss, Moshav Hodaya (IL)

( * ) Notice: Subject to any disclaimer, the term of this patent is extended or adjusted under 35 U.S.C. 154(b) by 6 days.

(21) Appl. No.: 14/442,097

(22) PCT Filed: Nov. 11, 2013

(86) PCT No.: PCT/IB2013/060050
§ 371 (c)(1),
(2) Date: May 12, 2015

(87) PCT Pub. No.: WO2014/076622
PCT Pub. Date: May 22, 2014

(65) Prior Publication Data
US 2016/0292524 A1      Oct. 6, 2016

Related U.S. Application Data

(60) Provisional application No. 61/726,014, filed on Nov. 14, 2012.

(51) Int. Cl.
*G06K 9/00* (2006.01)
*G07C 9/00* (2006.01)

(52) U.S. Cl.
CPC ....... *G06K 9/00912* (2013.01); *G06K 9/0008* (2013.01); *G06K 9/00033* (2013.01);
(Continued)

(58) Field of Classification Search
CPC  G06F 21/32; G06K 9/00013; G06K 9/00087; G06K 9/00885; G06K 9/0006; G06K 2009/00932; H04L 63/0861
See application file for complete search history.

(56) References Cited

U.S. PATENT DOCUMENTS

2004/0184641 A1   9/2004  Nagasaka
2005/0148876 A1   7/2005  Endoh et al.
(Continued)

FOREIGN PATENT DOCUMENTS

CN      101281600 B      12/2008
EP       1912151 A1  *   4/2008

OTHER PUBLICATIONS

Goh Kah Ong, M et al.: "A Contactless Biometric System Using Palm Print and Palm Vein Features", Control Automation Robotics & Vision (ICARCV, 2010 11th International Conference on, Dec. 7, 2010 (Dec. 7, 2010), pp. 1268-1273, ISBN: 978-1-4244-7814-9, Retrieved from the Internet <URL: http://cdn.intechweb.org/pdfs/17745.pdf>.

(Continued)

*Primary Examiner* — Edward Park
(74) *Attorney, Agent, or Firm* — Hanan Farber Patent Agent Ltd.

(57) ABSTRACT

Biometric methods for enrollment and authentication of a person. During authentication, a previously stored enrollment image is presented on a display to the person. A candidate person is instructed to present a body part to a camera while the person is holding the body part unsupported in free space with respect to the camera. Using the camera, a candidate image of the body part is captured and presented with the previously stored enrollment image. The candidate person aligns the candidate image with the previously stored enrollment image. On alignment, the candidate image is verified as an authentic image of the person and the candidate person is authenticated as the person previously enrolled.

19 Claims, 17 Drawing Sheets

(52) U.S. Cl.
CPC ..... *G06K 9/00255* (2013.01); *G06K 9/00281* (2013.01); *G06K 9/00604* (2013.01); *G06K 9/00926* (2013.01); *G07C 9/00158* (2013.01); *G07C 2209/02* (2013.01)

(56) References Cited

U.S. PATENT DOCUMENTS

| | | | |
|---|---|---|---|
| 2005/0185827 A1* | 8/2005 | Kono | G06K 9/00 382/124 |
| 2007/0058841 A1 | 3/2007 | Miura | |
| 2007/0154074 A1 | 7/2007 | Schneider et al. | |
| 2008/0148059 A1 | 6/2008 | Shapiro | |
| 2008/0192988 A1 | 8/2008 | Uludag et al. | |
| 2009/0046331 A1* | 2/2009 | Dufresne de Virel | G06K 9/00033 358/474 |
| 2010/0177182 A1 | 7/2010 | Kagenow et al. | |
| 2010/0228692 A1 | 9/2010 | Guralnik et al. | |
| 2010/0315498 A1 | 12/2010 | Choi | |
| 2011/0169934 A1 | 7/2011 | Pulluru | |
| 2011/0182480 A1 | 7/2011 | Murakami | |
| 2011/0228989 A1 | 9/2011 | Burton | |
| 2011/0235872 A1* | 9/2011 | Rowe | G06K 9/00033 382/124 |
| 2011/0243396 A1 | 10/2011 | Hama et al. | |
| 2012/0057763 A1 | 3/2012 | Horng | |
| 2012/0086794 A1 | 4/2012 | Burcham et al. | |
| 2013/0129164 A1 | 5/2013 | Gu et al. | |
| 2013/0136317 A1 | 5/2013 | Shinzaki | |
| 2013/0167226 A1 | 6/2013 | Lin | |
| 2013/0182913 A1 | 7/2013 | Hoyos et al. | |
| 2013/0200995 A1 | 8/2013 | Muramatsu et al. | |
| 2013/0347086 A1 | 12/2013 | Sahin | |

OTHER PUBLICATIONS

Li, W et al.: "Image alignment based on invariant features for palmprint identification", Signal Processing: Image Communication., vol. 18, No. 5, May 1, 2003 (May 1, 2003), pp. 373-379, XP004416075, DOI: doi:10.1016/S0923-5965(03)00011-0.

* cited by examiner

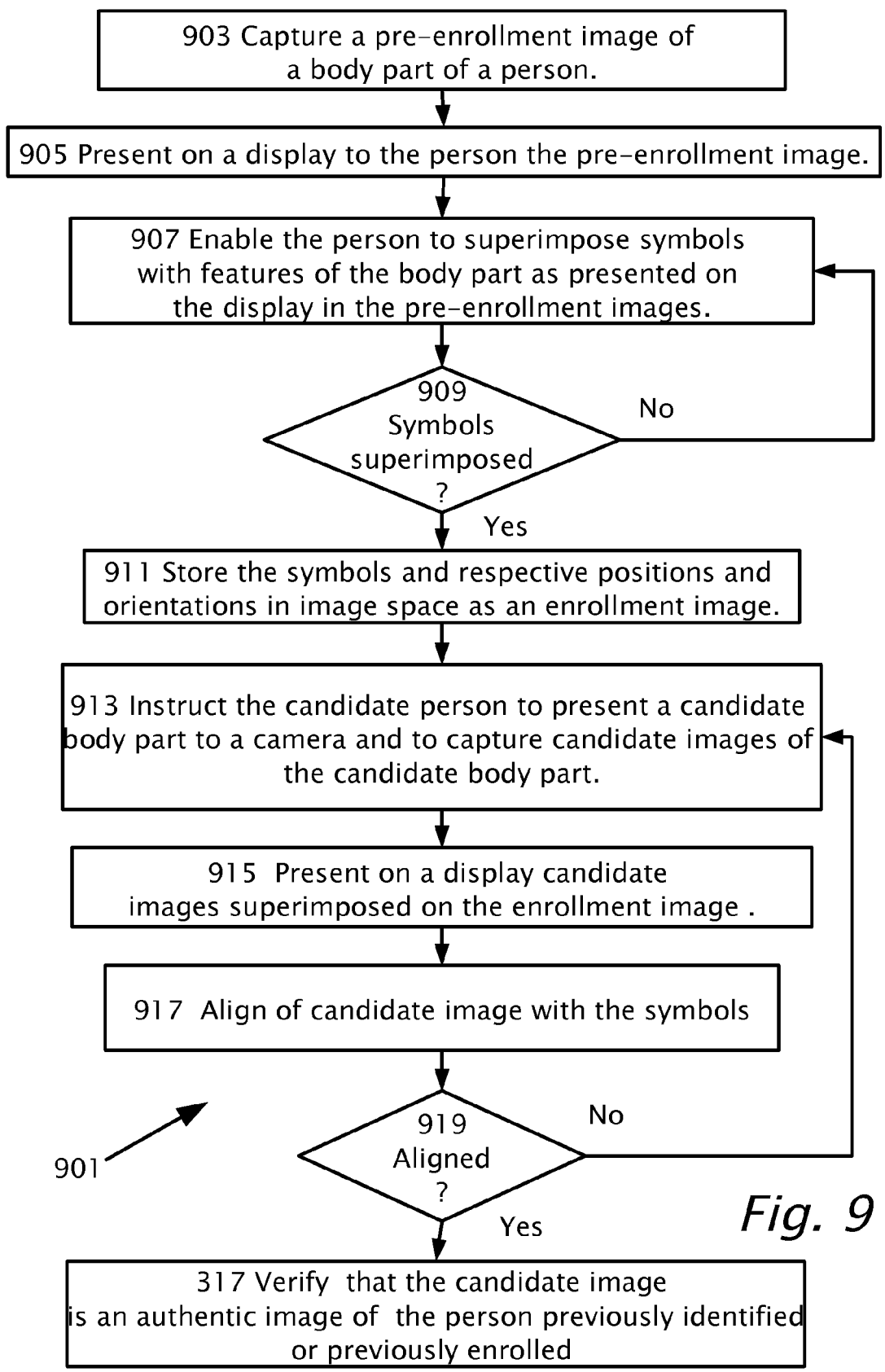

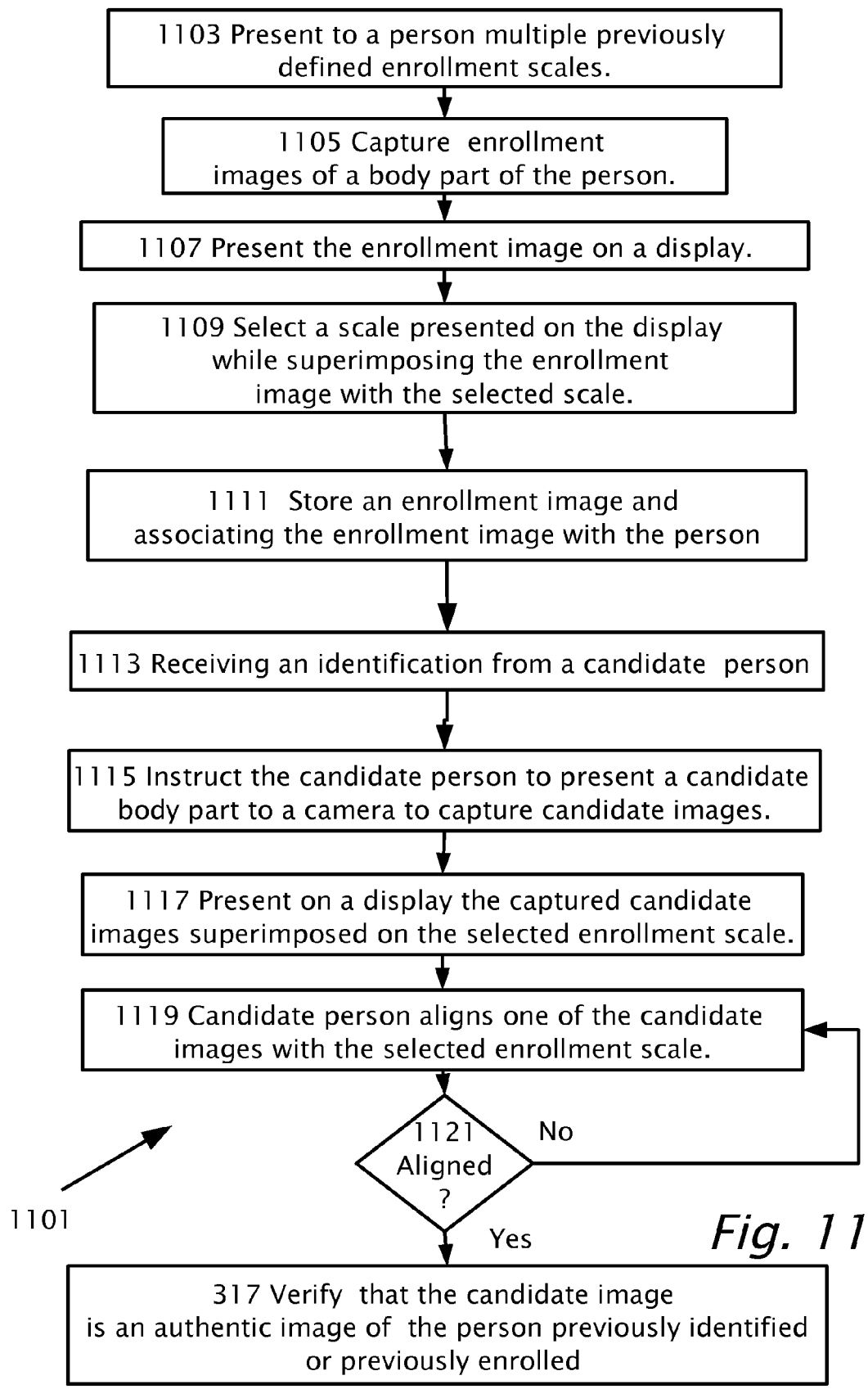

BIOMETRIC METHODS AND SYSTEMS FOR ENROLLMENT AND AUTHENTICATION

BACKGROUND

1. Technical Field

The field of the present disclosure relates to biometric methods for enrollment and authentication of a person using a camera and a display.

2. Description of Related Art

Many resources have been invested into developing reliable schemes for identity verification in order to prevent fraud in electronic commerce. Existing methods for identity verification may rely on an item that the person possesses, such as a smart card or a datum that the person knows, such as a password, personal identification number (PIN) or other information.

Considerable effort has been invested in identity verification using biometrics, based on physiological and/or behavioral characteristics. Characteristics used for biometric authentication may include fingerprint, retina or iris scanning, voice, signature, and/or face.

U.S. Pat. No. 7,327,858 discloses biometric authentication using prominent lines of the hand when scanned by a scanning unit such as a scanner with a planar platen.

BRIEF SUMMARY

Various computerized biometric methods for enrollment and authentication of a person are provided for herein. During authentication, a previously stored enrollment image is presented on a display to the person. A candidate person is instructed to present a body part to a camera while the person is holding the body part unsupported in free space with respect to the camera. Using the camera, a candidate image of the body part is captured and presented with the previously stored enrollment image. The candidate person aligns the candidate image with the previously stored enrollment image. On alignment, the candidate image is verified as an authentic image of the person and the candidate person is authenticated as the person previously enrolled. The previously stored enrollment image may be generated independently from the person. The same enrollment image may be displayed for the enrollment of multiple previously unenrolled persons.

During the enrollment, a person may hold a body part unsupported in free space with respect to the camera. The camera may be used to capture the enrollment image of the body part and background thereof. The authentication may include capturing the time series of the candidate images of the candidate body part and background thereof. Alternatively, an enrollment image is captured from a medium such as a passport, drivers license, identity card or other document used for identification.

During the capture, the time series of candidate images is presented on a display superimposed on the enrollment image with the respective backgrounds thereof.

The body part may a portion of a face, a hand, at least an ear, and/or an eye. The candidate person may align a feature of the body part in the candidate images with a corresponding feature in the enrollment image. The feature and the corresponding feature may be: a line, a ridge, a beauty mark, a scar, a mole, an area of differing skin pigmentation, a birth mark and a wrinkle.

Verification may be performed by comparing the enrollment image with the authentication image. The alignment may include alignment in horizontal, vertical image coordinates, angular orientation in image space, and real space distance to camera.

Prior to presentation of the previously stored enrollment image, the enrollment image may be processed by performing horizontal mirror inversion of the enrollment image.

The candidate person may be instructed to align a feature of the body part in the candidate images with a corresponding feature in the enrollment image. Upon the candidate person aligning the feature of the body part in the candidate image with the corresponding feature in the enrollment image, one or more of the candidate images is verified as an authentic image of the candidate person. One or more candidate images may be authenticated thereby as an authentic image of the candidate person. The candidate person is then authenticated as the person previously enrolled by comparing the feature in the candidate image with the corresponding feature in the enrollment image.

A pre-enrollment image of a body part may be captured while the person is holding a body part of the person unsupported in free space with respect to the camera. The pre-enrollment image may be presented to the person on a display. Upon presentation of the pre-enrollment image, the person may superimpose symbols with imaged features of the body part as presented on the display. Upon superimposing the symbols with the imaged features of the body part, the enrollment image is stored with the symbols and respective positions and orientations of the symbols in image space in the pre-enrollment image. Prior to the superimposition, the symbols may be relocated, re-sized and/or rotated. The presentation on the display to the candidate person of the enrollment image may include the stored symbols and at least a portion of an image of the body part. Alternatively, the presentation on the display to the candidate person of the enrollment image may include presentation of the stored symbols without any portion of an image of the body part.

Multiple previously defined enrollment scales may be presented on a display to the person. The person may select one or more of the scales presented on the display to produce thereby a selected enrollment scale. The person may superimpose and/or reposition one of the enrollment images with the selected scale. The selected scale may be stored as an enrollment image. The authentication includes presentation on a display of the time series of the candidate images superimposed on the selected enrollment scale The candidate person may align the candidate images with the selected enrollment scale.

During the authentication, the presentation of the enrollment scale to the person may include multiple enrollment scales and the candidate person may select person the selected enrollment scale.

Various mobile computer systems are provided herein enabled to perform the computerized biometric methods as disclosed herein, wherein the camera and the display are parts of the mobile computer system.

Various computer readable media are provided for herein encoded with processing instructions for causing a processor to execute the methods disclosed herein.

The foregoing and/or other aspects will become apparent from the following detailed description when considered in conjunction with the accompanying drawing figures.

BRIEF DESCRIPTION OF THE DRAWINGS

The invention is herein described, in a non-limiting manner, by way of example only, with reference to the accompanying drawings, wherein:

FIGS. 9, 10a and 10b show a flow diagram of a method and enrollment images respectively, according to different features of the present invention.

FIG. 11 shows a flow diagram illustrating a method, according to a feature of the present invention.

Figure 1:
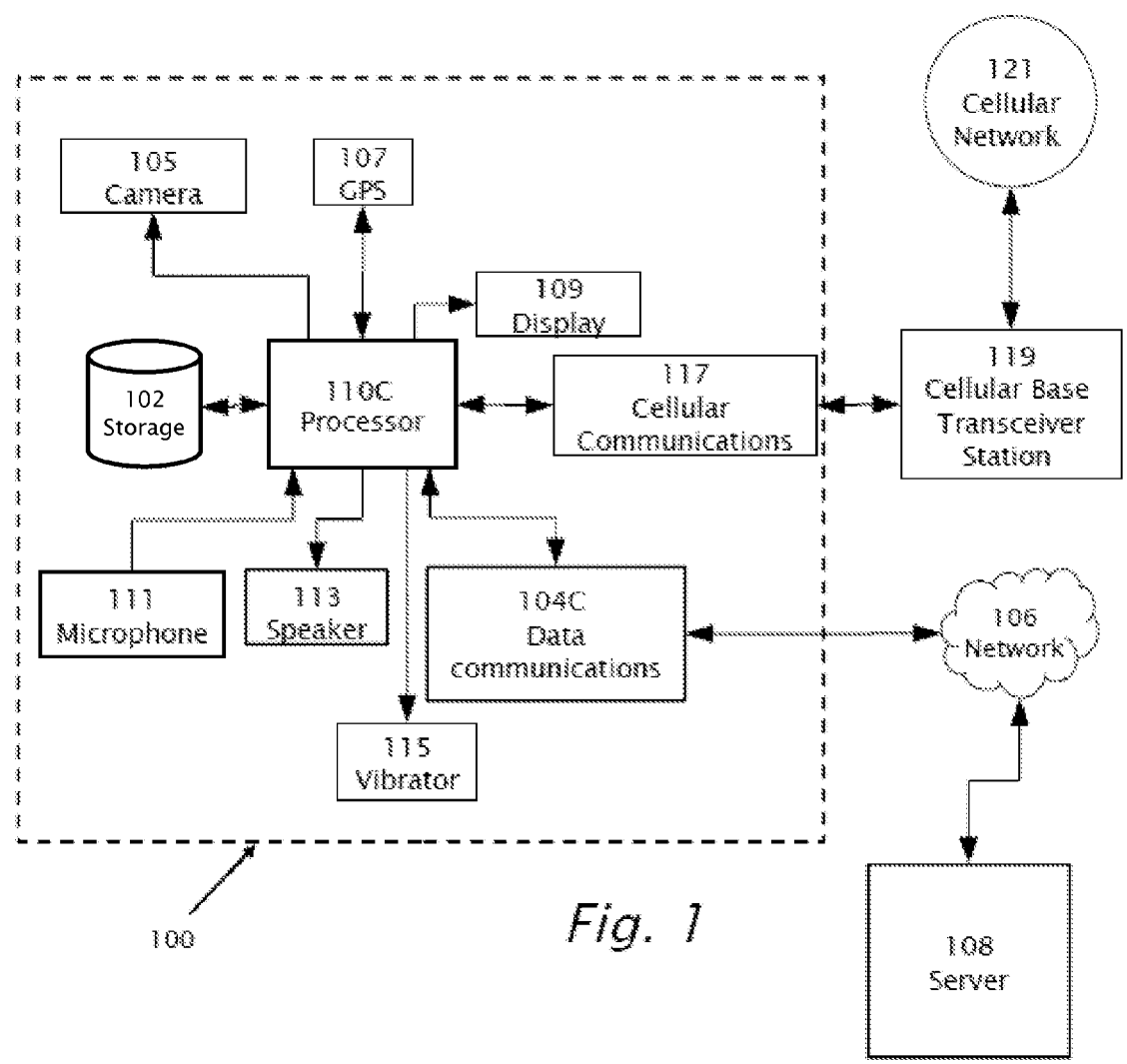
FIG. 1 illustrates a simplified block diagram of a mobile computer system, for operation of different features of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

The term "registration" as used herein refers to spatial alignment of image features of different images captured at different places and/or times of similar or identical objects in different image frames.

The term "identification" as used herein refers to receiving initial information, name, identity card number or other information useful for uniquely identifying the user which a user presents prior or during enrollment.

The term "enroll" or "enrollment" as used herein refers to an initiation of a user in the biometric system during which biometric information is received and stored for later identity verification or authentication. The term "enrollment image" refers to image capture during enrollment The term "authentication" as used herein refers to a biometric verification that the user is who he/she is claimed himself/herself to be during identification.

The term "verification" as used hereinafter refers to authentication or denial of authentication based on biometric image features of the candidate person as one of the previously enrolled persons or the previously identified person.

The term "superimpose" as used herein in the context of presenting two or more images simultaneously on a display includes either (i) combining two or more images using image processing techniques and presenting the combined image and/or (ii) presenting to the user alternatively two or more images so that the appearance to the user is that of a combined superimposed image.

The term "body part" as used herein for use in biometric enrollment and authentication may includes: a hand, an eye, an ear, a nose or a facial profile or portions thereof of the person.

The articles "a", "an" is used herein, such as "a candidate image", "an enrollment image", "a background" have the meaning of "one or more" that is "one or more candidate images", "one or more enrollment images" and "one or more backgrounds".

By way of introduction, different embodiments of the present invention may find use in a number of different biometric methods to identify and enroll a user in the system and subsequently authenticate a candidate person as one of the previously enrolled users. Embodiments of the present invention are intended to be used with a camera and a two-dimensional or three dimensional display as may be available in a mobile computer system, e.g. smart-phone. In some embodiments of the present invention, the user during enrollment presents unsupported in free space a body part, e.g. hand, and an enrollment image is captured. Subsequently, the person when for instance he/she desires to perform an Internet transaction, for example, presents the same body part, e.g. hand, and an authentication image is captured also with the hand unsupported with free space between the camera and hand. The authentication image may be processed to be of the same hand as used for the enrollment image and authentication is achieved, or otherwise authentication is denied.

When an enrollment image is used again for authentication, the enrollment image when presented for authentication purposes may be distorted, warped, filtered, blurred, manipulated in gray scale or color, resolution reduced, partially displayed or otherwise image processed, to render it difficult for an imposter to reconstruct an authentication image from the enrollment image when presented during authentication.

In various embodiments of the present invention to be presented in further detail, authentication may be in a different location and/or time or date or using a different computer system from enrollment, and any body part may suitable for biometric enrollment and authentication.

The processing for authentication and verification of identity may be similar to the processing techniques disclosed in U.S. Pat. No. 7,327,858 such as by comparing specific features between the enrollment and authentication images. The features used in U.S. Pat. No. 7,327,858 are the prominent lines of the hand. However, according to prior art methods, before the actual authentication processing may be performed, image registration is performed during which the respective images of the same features of interest are located in both the enrollment image and authentication image.

Various embodiments of the present invention are intended to avoid or facilitate image registration between the common imaged features of interest in the enrollment image and in the authentication. Avoiding or facilitating image registration to reduce the computational burden on the processor being used and/or decrease computational time required.

Thus there is a need for and it would be advantageous to have methods and systems useful for avoiding and/or facilitating image registration between enrollment images and authentication images to enable biometric authentication of using image capture of unsupported body parts held in free space.

Although in some embodiments of the present invention a mobile computer system is used for enrollment and authentication, in other embodiments a non-mobile computer system and otherwise a dedicated computer system may also or alternatively be used.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates a simplified block diagram of a mobile computer system 100 according to features of the present invention. Mobile computer system 100 is connectible over a network 106 to a server 108. Mobile computer system 100 is also connectible through a cellular base station transceiver 119 to cellular network 121. Mobile computer system 100 includes a processor 110C connected to local data storage 102. A data communications module 104C operatively connects processor 110C to data network 106. A cellular communications module operatively connects processor 110C to cellular network 121. Mobile computer system 100 may include operatively connected to processor 110C peripheral accessory devices such as a display 109, global positioning system 107, a camera 105, a microphone 111, a speaker 113, a vibrator 115 and accelerometer /gravity sensor, Bluetooth™, IR sensor (not shown).

Figure 2:
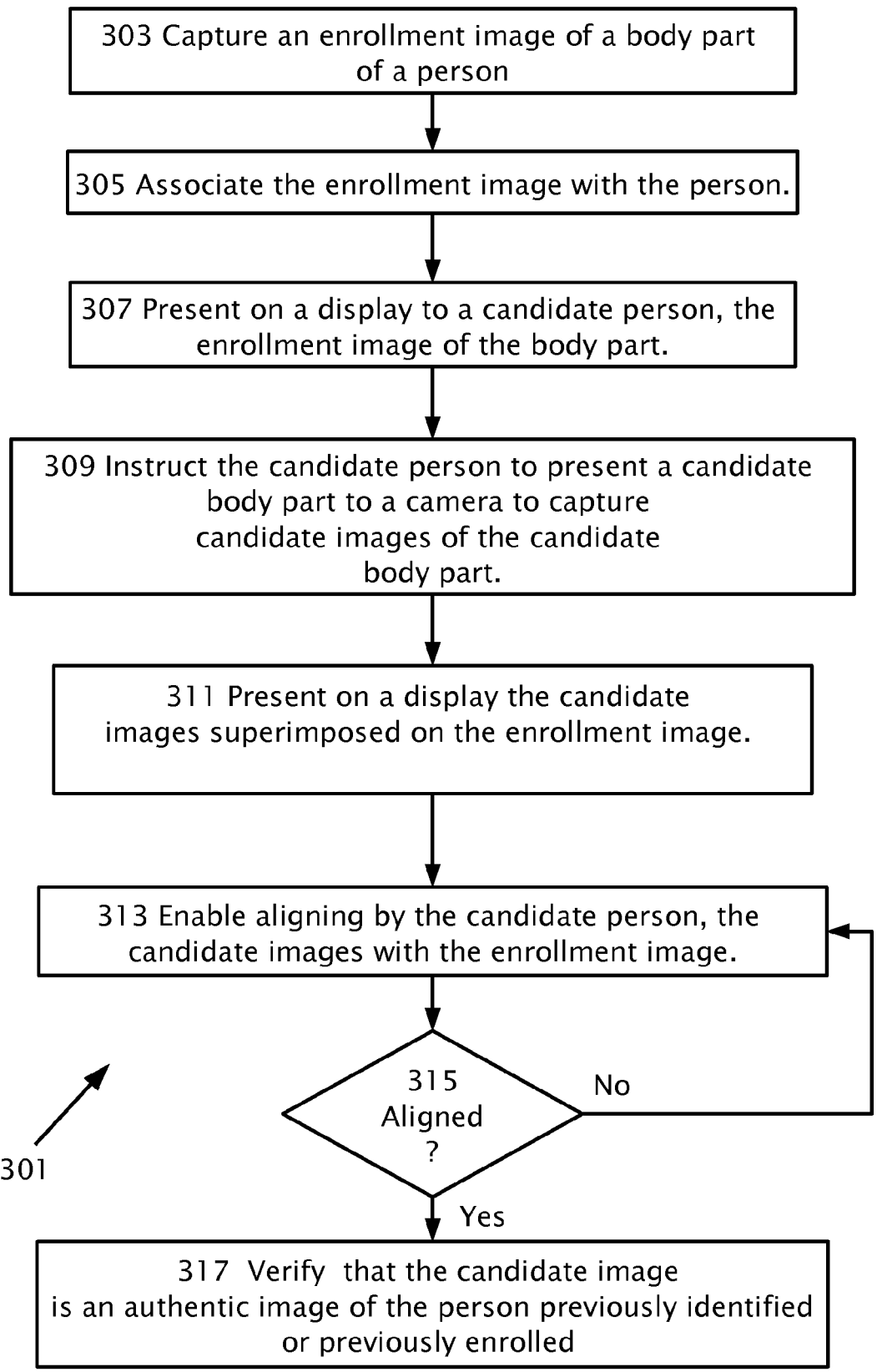
FIG. 2 shows a flow diagram of a method, according to a feature of the present invention.

Reference is now made to FIG. 2 which shows a method 301 of biometric enrollment and authentication, according to a feature of the present invention. Method 301 includes steps 303, 305 for enrollment of a person and steps 307-317 for authentication/non-authentication or verification of a person. In step 303, an image of a body part, e.g. hand of a person is captured, using camera 105 of mobile computer system 100 for instance, to capture an enrollment image of the body part.

Figure 2A:
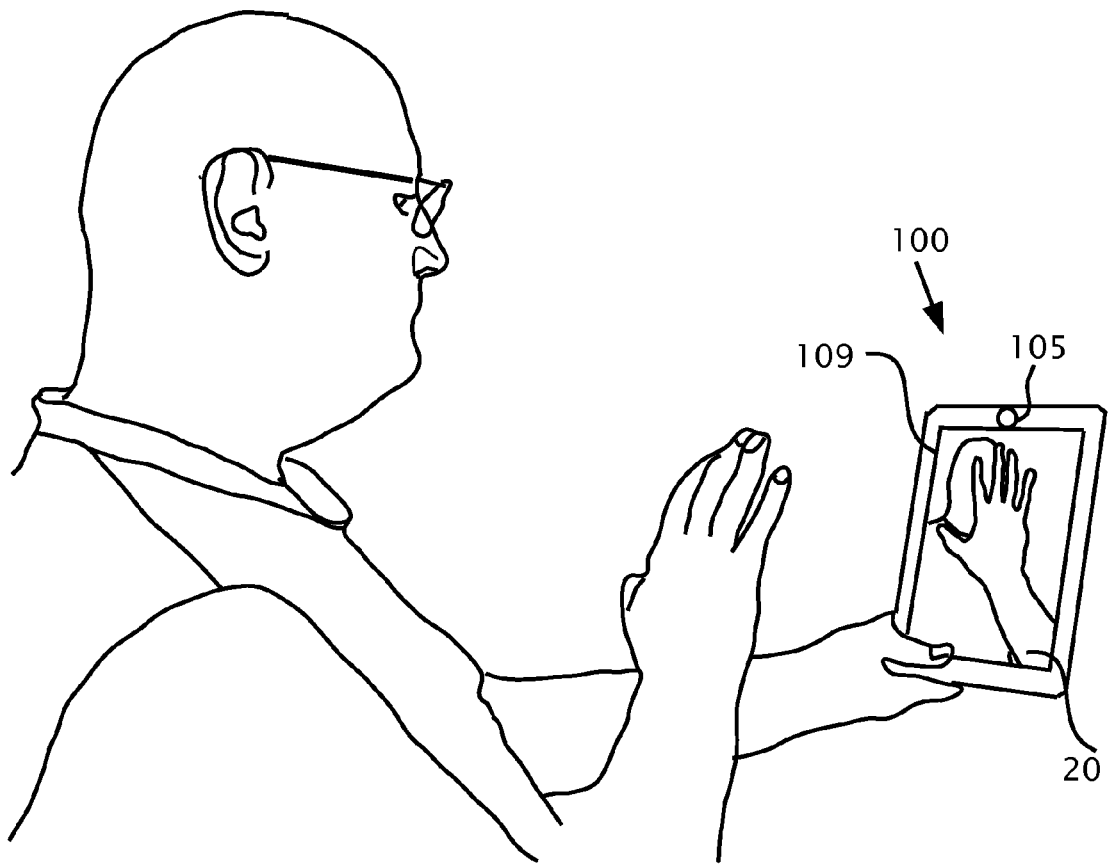
FIG. 2a shows a person holding her hand in free space with respect to a camera.

Reference is now also made to FIG. 2a which shows a person holding her hand in free space with respect to the camera 105 and/or display 109 (of an IPAD™ for example, being used as an example of a mobile computer system 100). Display 109 shows an enrollment image 20 of the palm, wrist plus arm of the person and the background which includes the face and torso of the person. Camera 105 and/or display 109 may be mounted on a stand so that both hands of the person are free. FIG. 2a is by way of example, another body part such as an ear or an eye may be captured to provide enrollment image 20. Alternatively, enrollment image 20 captured by camera 105 and/or a scanner may be of a picture on; a passport, drivers license, identity card or other document used for identification purposes.

Figure 3:
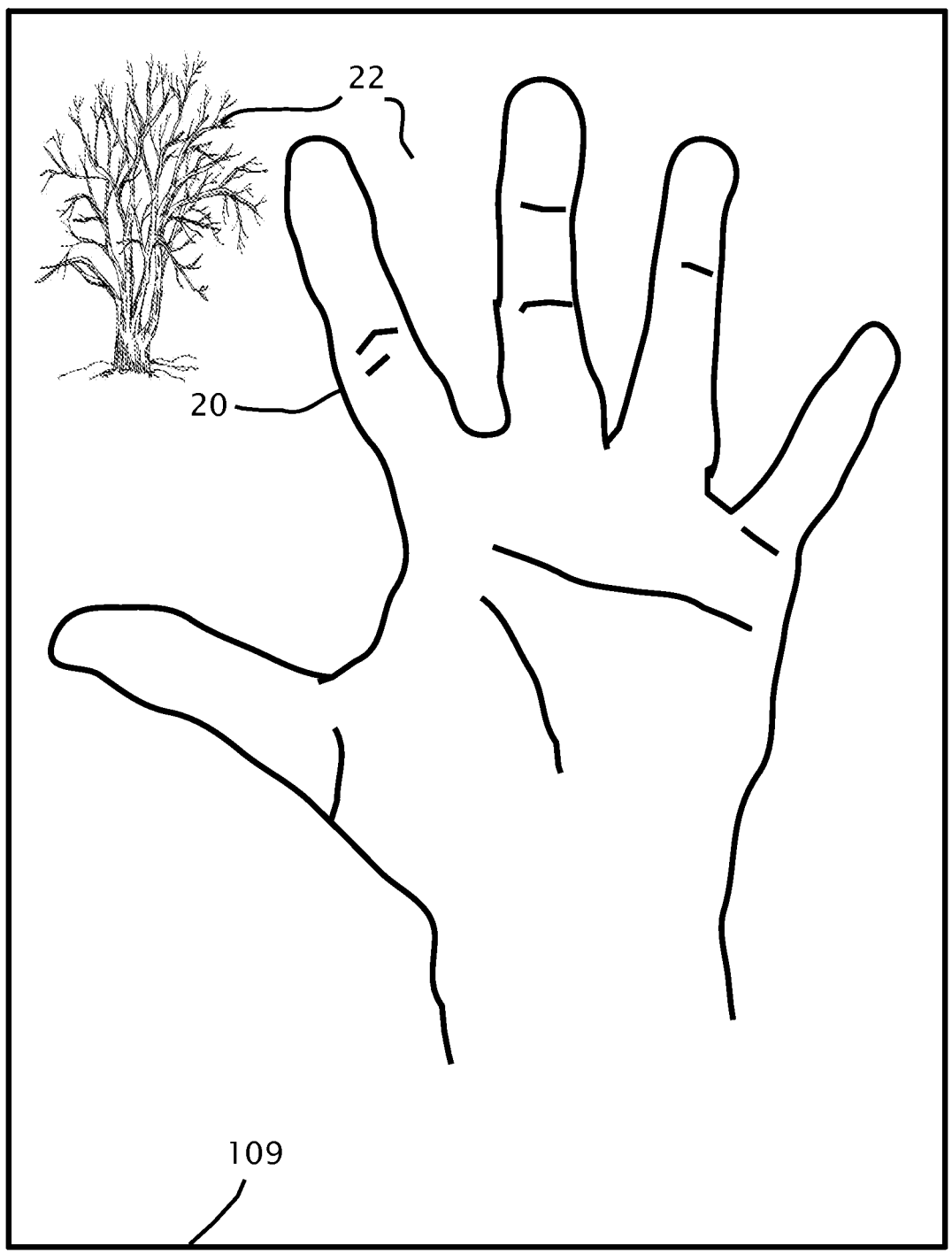
FIG. 3 shows an enrollment image presented on a display with a background also captured according features of the present invention.

Reference is now made to FIG. 3 which illustrates enrollment image 20 presented for example on display 109 of mobile computer system 100. A feature according to embodiments of the present invention includes avoiding processing to find the contour of enrollment image 20 of body part, e.g. hand; hence in FIG. 3, the image of the hand is presented with the background captured during enrollment. Background is shown schematically with an image 22 of a bush in FIG. 109.

Referring back to FIG. 2, in step 305 an enrollment image 20 is associated with the person. The association of the enrollment image 20 with the person may include the name of the person, date of birth of the person, an identification (ID) number or national insurance or social security number of the person.

Step 307 begins an authentication/non-authentication process of the person previously enrolled. Authentication may be in a different location and/or time or date or using a different computer system from enrollment steps 303-307.

Figure 4:
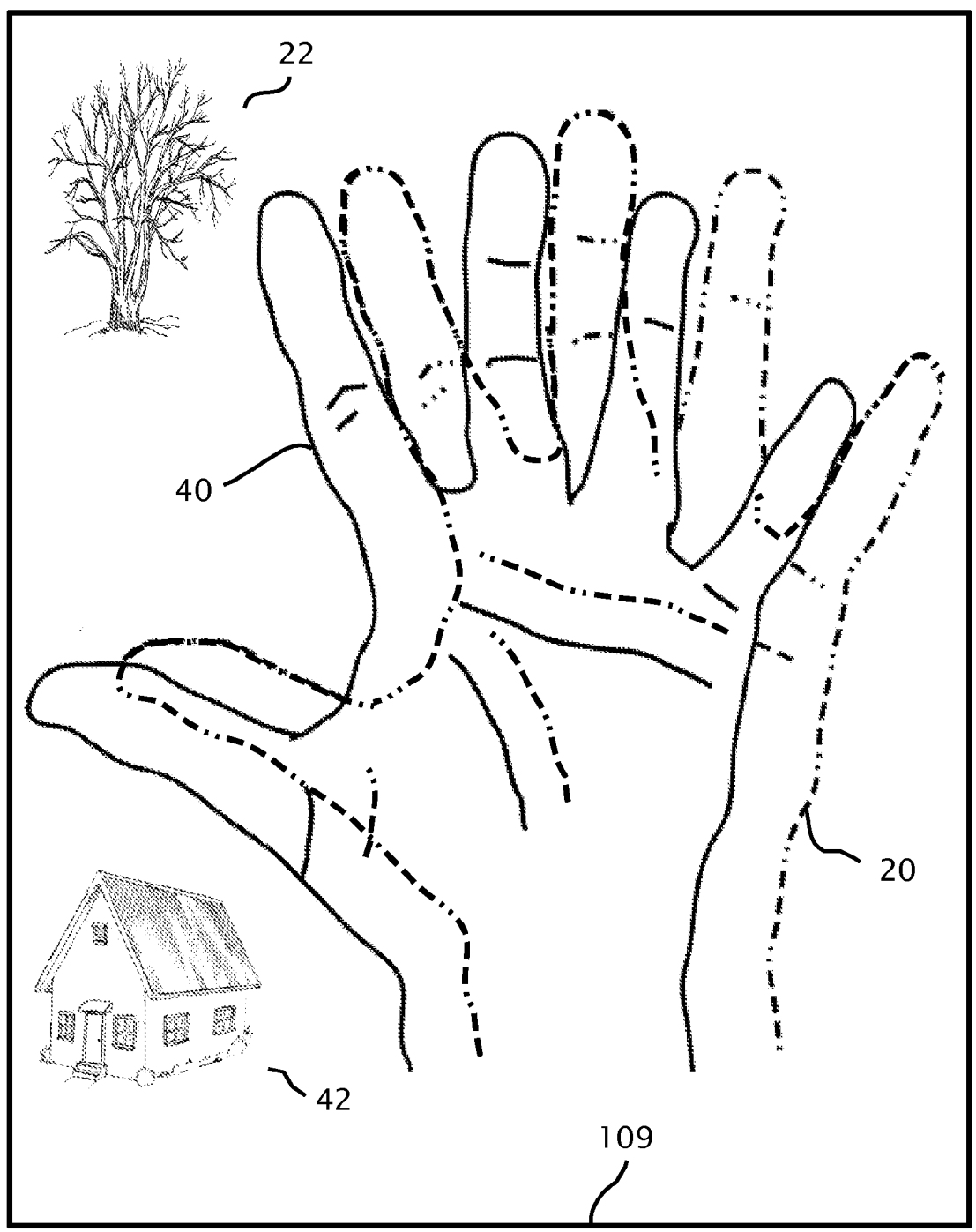
FIG. 4 shows enrollment and authentication images superimposed with respective backgrounds, according to the method illustrated in FIG. 2.

Reference is now also made to FIG. 4 which illustrates display 109 during authentication. In step 307, enrollment image 20 is presented on display 109 along with background image 22.

Referring back to FIG. 2, in step 309, a candidate person is instructed to present the body part, e.g. hand, to a camera 105 and a time series, e.g. video, of candidate images 40 are captured of the hand of the candidate person. Candidate images 40 may include image of the candidate body part of the candidate person as well as respective background images 42. According to a feature of the present invention, as in enrollment image 20, candidate images 40 are presented with respective backgrounds while avoiding finding the contour of the image of the body part to extract and present an image of the body part without background. In FIG. 4, background of candidate image 40 of hand is shown schematically with the image 42 of a house.

Still referring to FIG. 2, in step 311, the time series of candidate images 40 are displayed on a display 109 while capturing (step 309) along with enrollment image 20 previously captured in step 303. Therefore in step 311, one or more candidate images 40 are superimposed on the enrollment image 20 with the respective backgrounds 42 and 22.

In step 313, the candidate person aligns, i.e. positions and repositions the body part, e.g. hand, in front of camera 105 so that one or more candidate images 40 align with enrollment image 20 on display 109.

To enable alignment in step 313, enrollment image 20 and or candidate images 40 after being captured (step 303), may be processed such as with horizontal mirror inversion prior to display (step 311) on display 109.

The basis for alignment in step 313 may be a feature of the body part in the candidate images 40 with a corresponding feature in the enrollment image 20. The feature and the corresponding feature may be a ridge, a line, a scar, an area of differing skin pigmentation, a birth mark or a wrinkle on the body part or candidate body part respectively. Alignment step 313 includes alignment in horizontal, vertical image coordinates, angular orientation in image space, and real space distance to camera 105.

In decision block 315 when one or more candidate images 40 are aligned with the enrollment image 20 on display 109, verification step 317 may be performed. During verification, (step 317), the candidate person may be verified as a previously enrolled person and/or previously identified person in steps 303-305 by comparing the enrollment image 20 with an authentication image previously stored according to any techniques known in the art of image processing.

In decision block 315 when one or more candidate images 40 are not yet aligned with the enrollment image 20 on display 109, alignment continues in step 313 by the candidate person.

Figure 5:
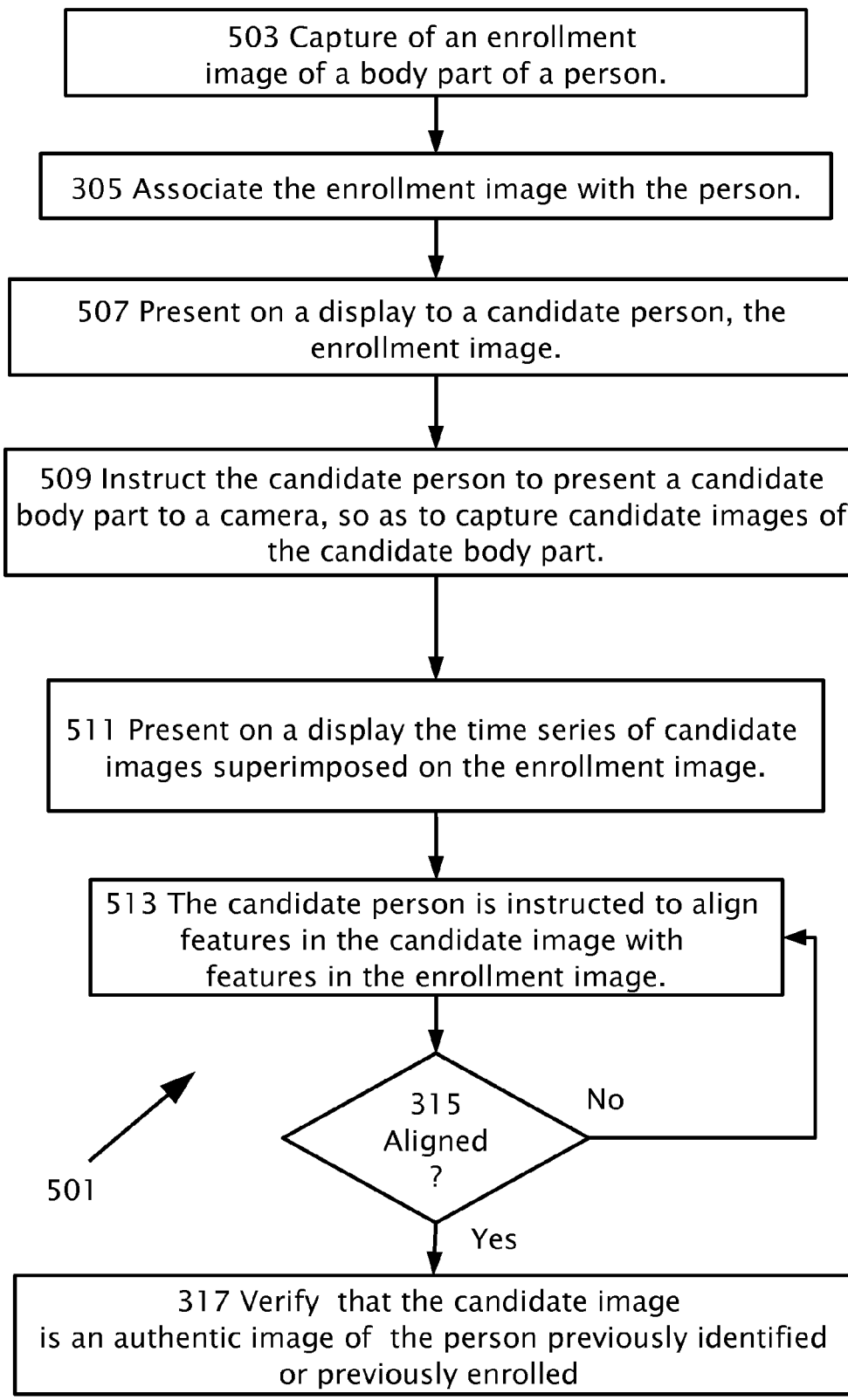
FIG. 5 which illustrates another method of biometric enrollment and authentication, according to a feature of the present invention.

Reference is now made to FIG. 5 which illustrates another method 501 of biometric enrollment and authentication, according to a feature of the present invention. Biometric method 501 includes steps for enrollment and authentication of a person. In step 503, a body part of a person is captured using camera 105, to produce an enrollment image 20 of the body part, e.g. hand. In step 305 the enrollment image 20 is associated with the person. Step 507 begins an authentication stage, the enrollment image 20 is presented on a display 109 with or without background 22. In step 509, a candidate person is instructed to present his/her hand for example, to a camera 105 and a time series of candidate images 40 are captured of the body part, e.g. hand of the candidate person. Candidate images 40 includes an image of a candidate body part of the candidate person presented with or without background image 42.

In step 511 the time series of candidate images are displayed on a display 109 during capturing (step 509) along with display of the enrollment image 20 (with or without background 22) previously captured in step 503. In step 511, the candidate images 40 are superimposed on the enrollment image 20.

In step 513, the candidate person is able to align, position and reposition his/her hand in front of camera 105 so that candidate images 40 are aligned with enrollment image 20 on display 109.

In order to facilitate alignment, enrollment image 20 and/or candidate images 40 after being captured (step 503), may be processed with horizontal mirror inversion prior to display on display 109.

The basis for alignment in step 513 may be an image of a feature of the body part in candidate images 40 with a corresponding image of a feature in the enrollment image 20. The feature and the corresponding feature may be a ridge, a line, a scar, an area of differing skin pigmentation, a birth mark or a wrinkle on the body part or candidate body part respectively. The term "feature" as used herein in the context of alignment of a body part excludes "contour" or the outer edge the body part. Alignment in step 513 may be performed without aligning imaged contours of the body part. The image contours are not necessarily visible on display 109 for candidate images 40 and/or enrollment image 20. Alignment step 513 of an image feature includes alignment in horizontal, vertical image coordinates, angular orientation in image space, and real space distance to camera 105.

In decision block 315 when one or more candidate images 40 are aligned with the enrollment image 20, authentication/non-authentication may be performed. Authentication of the candidate person may be verified as the previously enrolled person by comparing the enrollment image 20 with the authentication image. Authentication is verified by associating (step 317) the candidate image as an authentication image of the candidate person.

In decision block 315 when the time series of candidate images 40 are not fully aligned with the enrollment image 20 on display 109, alignment by the candidate person the candidate images 40 with the enrollment image 20 continues in step 513.

Figure 6:
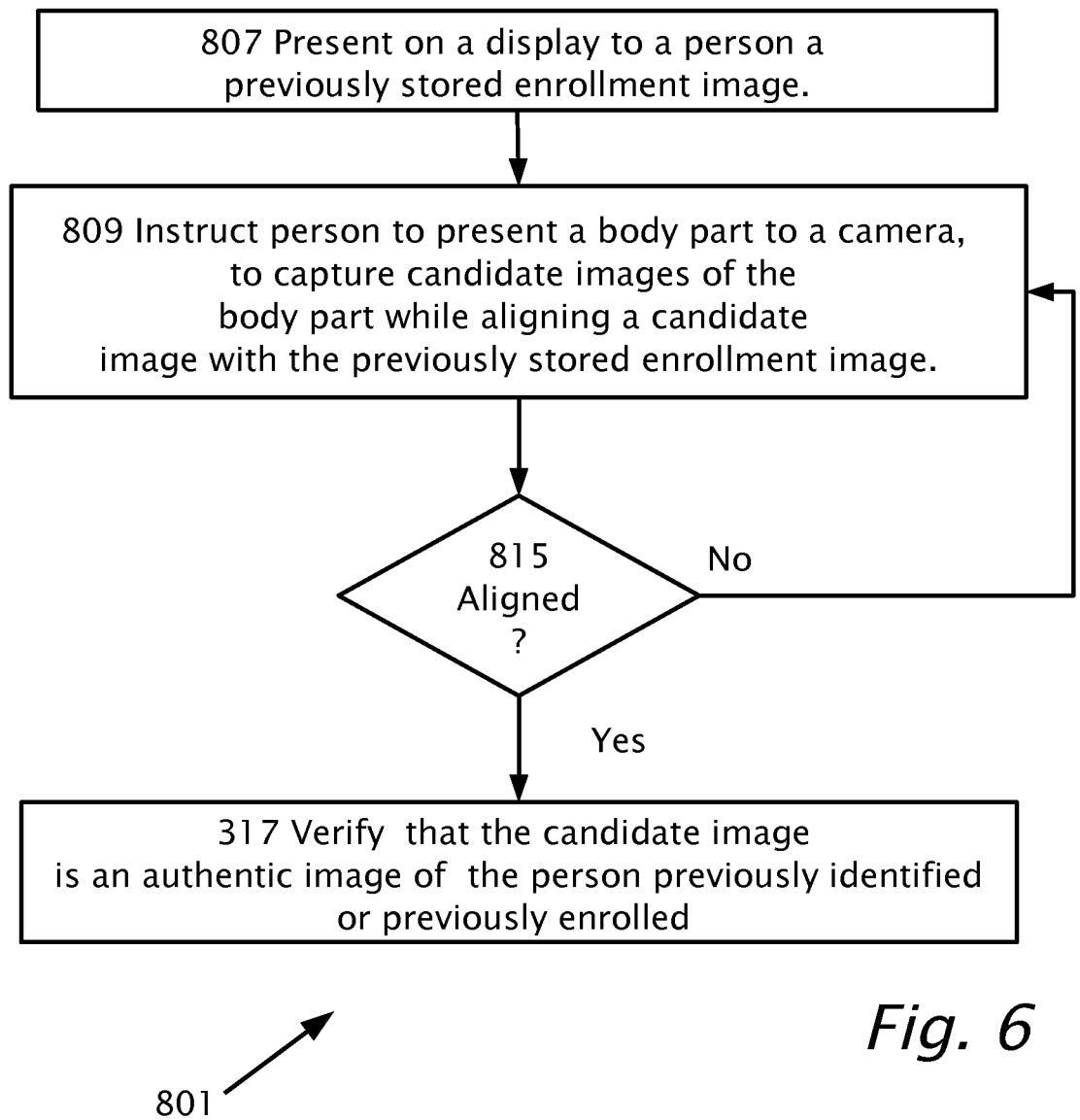
FIGS. 6 and 7 show examples of previously stored enrollment images respectively on a display, according to a feature of the present invention.
Figure 7:
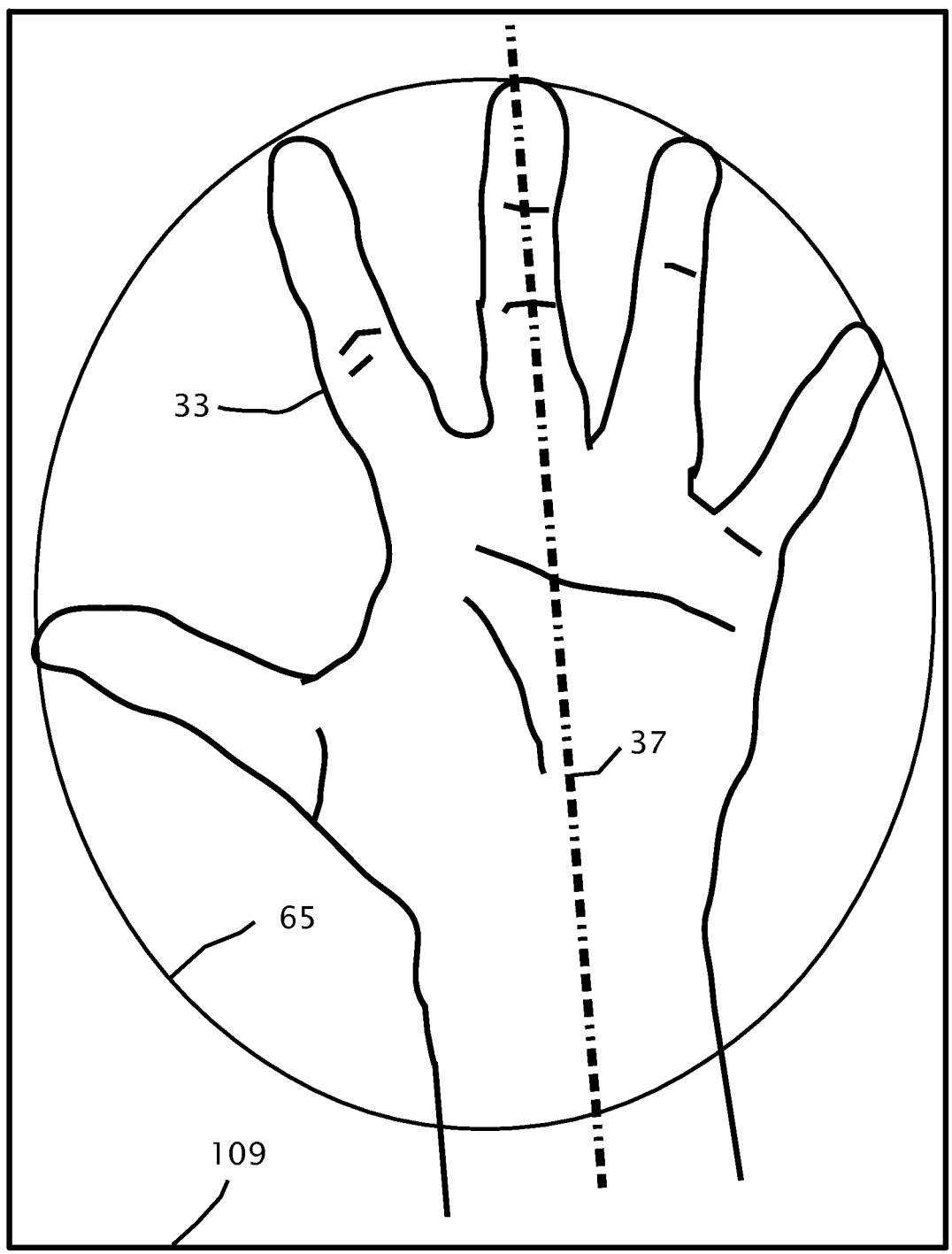
Figure 8:
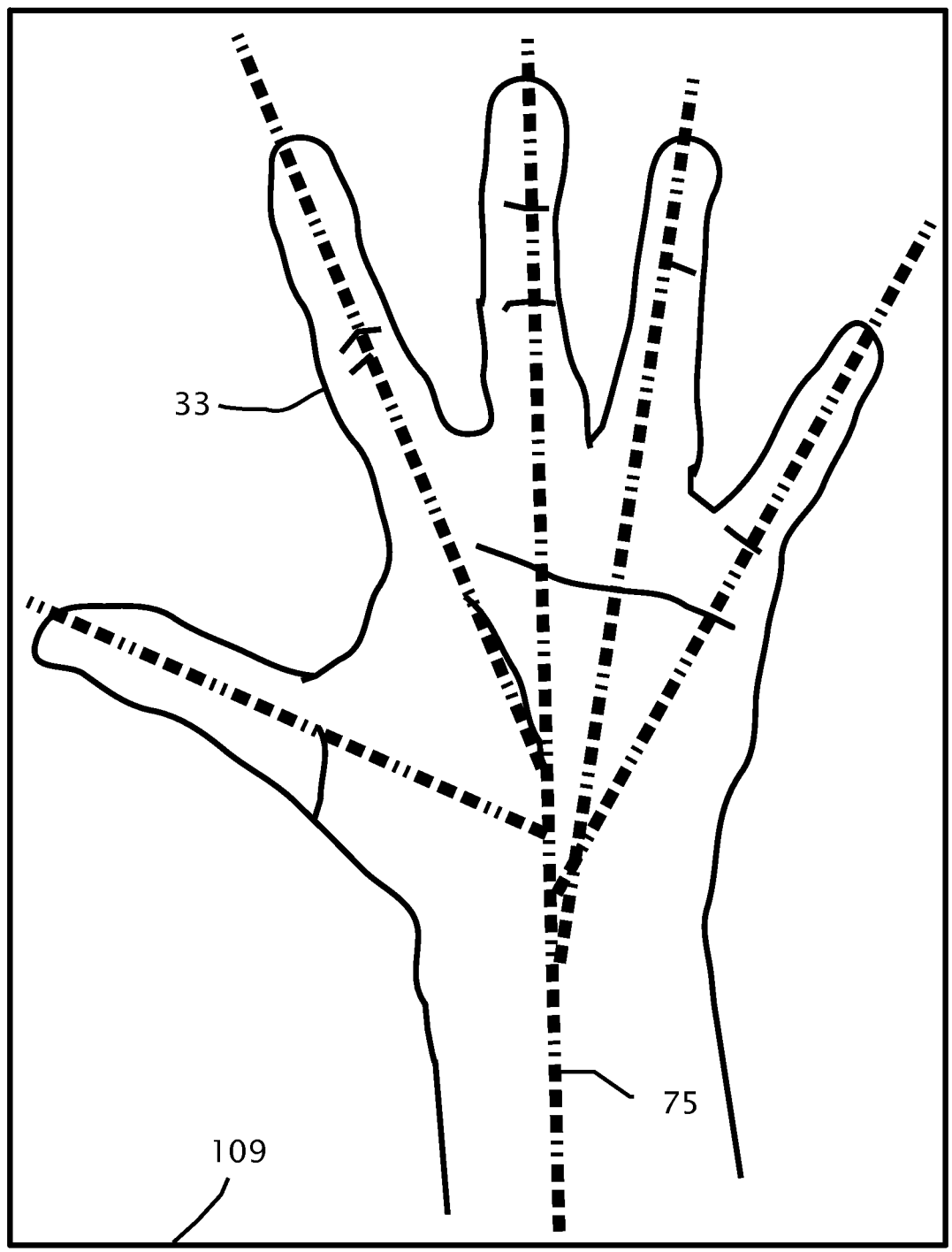
FIG. 8 shows a flow diagram of a method, including different features of the present invention.

Reference is now made to FIG. 6 which shows a method 801, according to a feature of the present invention. In step 807 a previously stored enrollment image is shown to a person for enrollment purposes. Reference is now also made to FIGS. 7 and 8 which show examples of previously stored enrollment images 65 and 75 respectively on display 109. Enrollment image 65 is an ellipse in which the person aligns the image of his/her hand 33 within ellipse 65. A dotted line 37 is shown going through ellipse 65 may be used to align the image of the middle finger and wrist. Image 75 includes dashed lines to which the person aligns respective images of his/her wrist and fingers of hand 33.

Referring back to FIG. 6, in step 809, the person is instructed to present a body part, e.g. hand 33 to camera 105. In step 809, candidate image 40 of the person is captured while the person attempts an alignment of candidate image 40 with the previously stored enrollment image displayed on display 109. With respect to image 65 and step 809, the person aligns images of each finger tip just within perimeter of ellipse 65 and the middle finger are aligned symmetrically around dotted line 37 going through ellipse 65. With respect to image 75 and step 809, the person tries to ensure that each finger of his/her hand 33 is centered and in parallel with dotted lines of image 75. In decision 815, once the alignment in step 809 is achieved, verification is performed by verifying (step 317) candidate image 40 as an authentic image of the person. Otherwise alignment by the person continues with step 809.

When previously stored enrollment images 65/75 are used, the enrolling person may select one or more previously stored enrollment images 65/75 from a bank of for instance ten to one hundred stored images stored in memory 102 of mobile computer system 100, for instance with which to perform enrollment capture step 503. The selection of the previously stored enrollment image 65/75 provides for additional security and allows for the person to select an enrollment image 65/75 suitable to her hand 33 in this example.

Figure 10A:
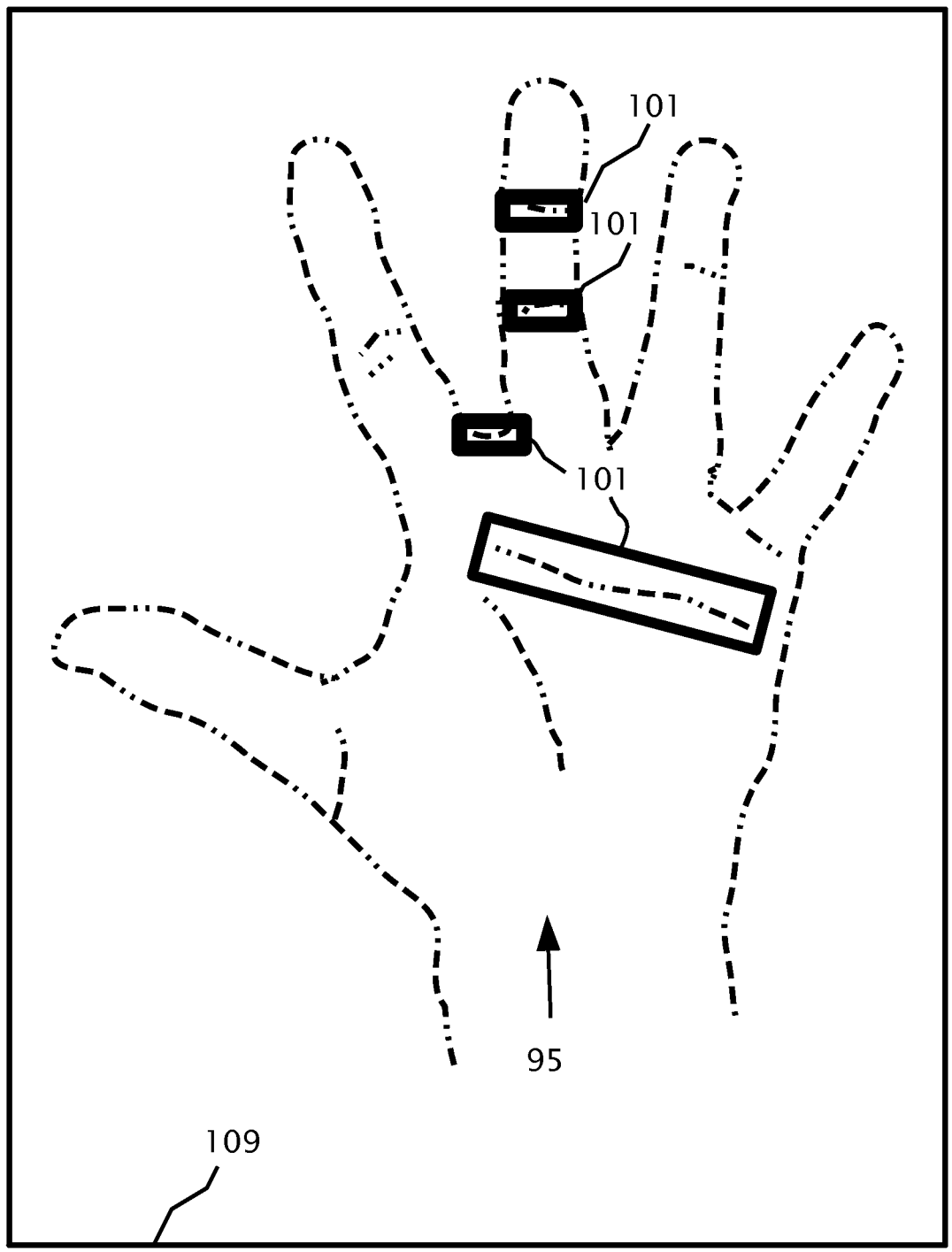

Reference is made to FIGS. 9 and 10 which show a method 901 and an enrollment image 95 shown on display 109 respectively, according to a feature of the present invention. In step 903, enrollment image 95 of a body part of a person is captured with camera 105. The body part as shown in enrollment image 95 (FIG. 10a) is the hand of the person. Enrollment image 95 as captured in step 903 is then presented to the person on display 109 (step 905). On the enrollment image, the person is able to superimpose (step 907) symbols 101, e.g. rectangle over features of the body part as presented on display 109.

Alternatively in step 907, the person is given the option via a menu on display 109 to hand-write and position their own symbols to be superimposed over features of the body part as presented on display 109. The handwriting of the person's own symbols to appear on display 109 is via a mouse, stylus operatively connected to computer system 100 or by finger touch of the person on display 109. The person's own symbols for example may be the selection of a free hand curve from the menu so that a contour of a chin or a hair line may be drawn.

Features of the hand as shown in FIG. 10a may include ridges, lines, wrinkles, scars or the curved portion connecting fingers. Superimposition (step 907) may include the person relocating, resizing and/or rotating the symbols over the features.

In decision 909, upon successfully superimposing symbols 101 on display 109 with features of the hand. The symbols 101 are stored along with respective positions, orientations, features of the hand and/or symbols 101 in image space as the enrollment image 95 (step 911). If the symbols 101 on display 109 are not yet superimposed with features of the hand, superimposing continues with step 907.

Referring back to FIG. 9, authentication of a candidate person now continues with steps 913-921. In step 913, the enrollment image 95 stored in step 911 is presented on display 109. Mobile computer system 100 in step 913, instructs the candidate person to present a candidate body part to a camera. With the candidate body part being a hand for example, a time series of candidate images are captured of the hand with camera 105. During capturing step 913, the time series of candidate images are superimposed (step 915) with enrollment image 95 and displayed on display 109. In step 917, at least one of the candidate images may be aligned with enrollment image 95 so that corresponding features in enrollment image 95 and one or more of candidate images are aligned. In aligning (step 917), the candidate may move her hand in front of camera 105 so that features, e.g. lines, wrinkles, etc used for identification known only by the enrolled person are aligned with symbols 101.

Alternatively in step 913 the candidate person is shown on display 109 multiple enrollment images 95 randomly selected in a consecutive manner with an unknown combination and timing. Additionally in step 913 a sequence of enrollment images 95 or an enrolled video is shown on display 109. The user's hand, for example, follows the enrollment video or the sequence of enrollment images 95 as displayed on display 109 optionally in an unpredictable apparently random manner. The enrollment video may change speed or even freeze on display 109. The candidate person may follow and may superimpose his candidate body part, e.g. hand, with the sequence of enrollment images on display 109 in real time.

In decision 919, upon a successful alignment of the correct features with the symbols then verification 317 may be performed based for instance on the teachings of U.S. Pat. No. 7,327,858. Otherwise, upon unsuccessful alignment or denial of authentication, the candidate person may instructed again to present her hand again in front of camera 105 with step 913.

Figure 10B:
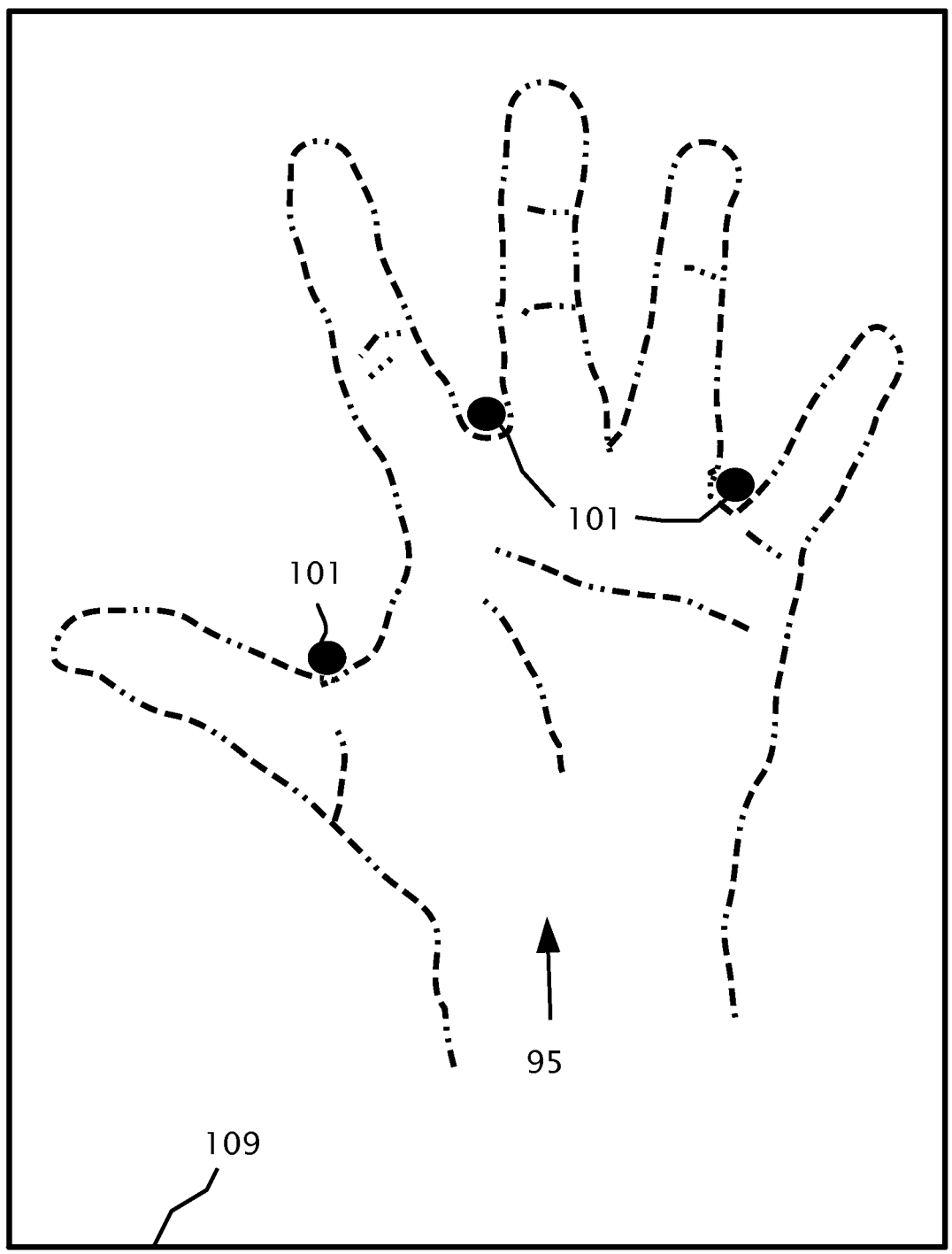

Reference is now made to FIG. 10b which illustrates another example of the use of symbols 101 shown as software pegs 101 on display 109. Software pegs 101b may be positioned by the person so that software pegs 101 locate the curved connection between fingers, for example.

Figure 12:
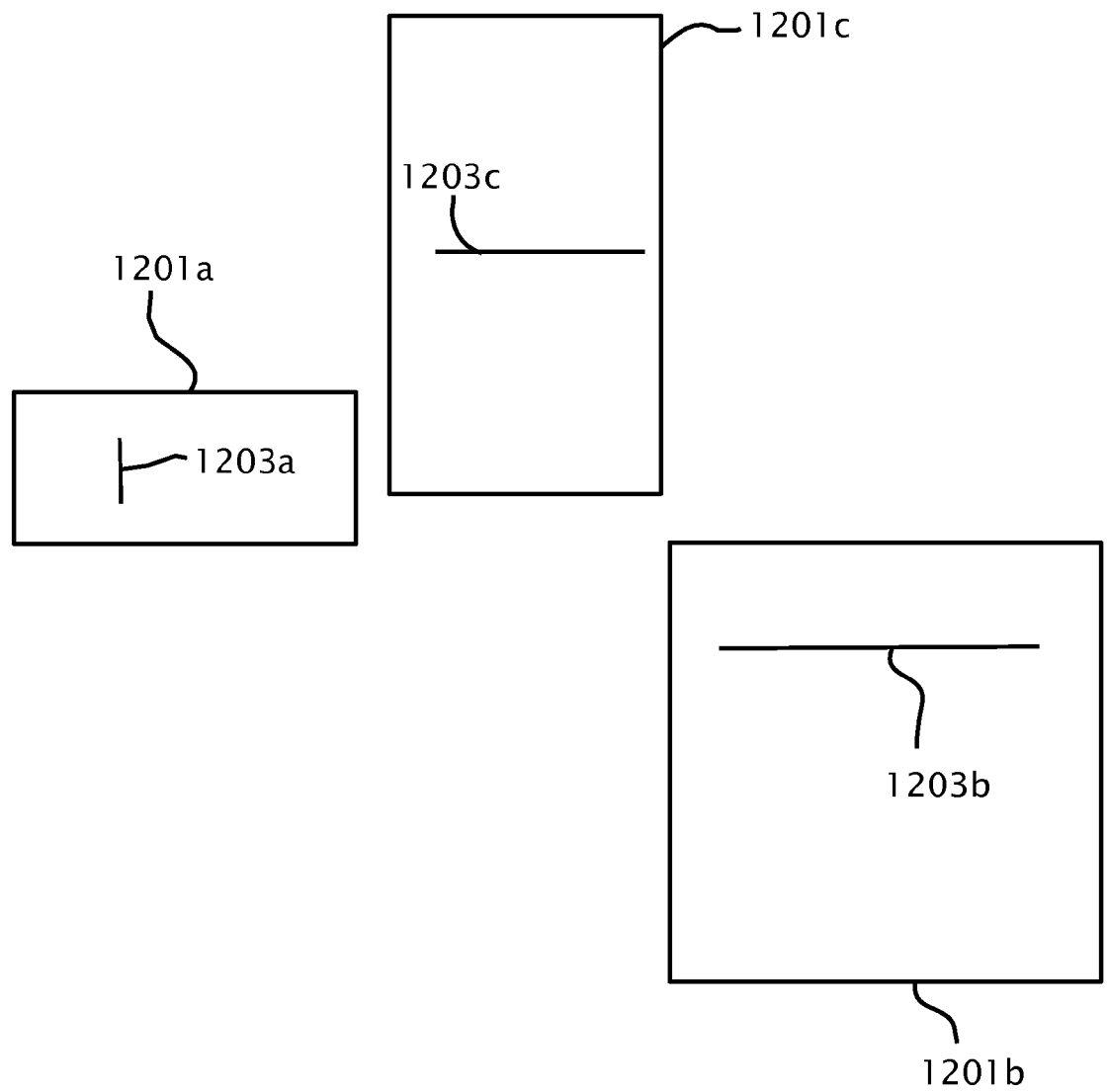
FIG. 12 shows examples of enrollment scales used in the method of FIG. 11.

Reference is made to FIG. 11 which includes a flow diagram illustrating a method 1101, according to a feature of the present invention. In step 1103, a person is presented with multiple previously defined enrollment scales on display 109. Examples of previously defined enrollment scales shown on display 109 are shown in FIG. 12 as scales or graticules 1201a-1201c which have respective graticule lines 1203a-1203c.

Figure 14:
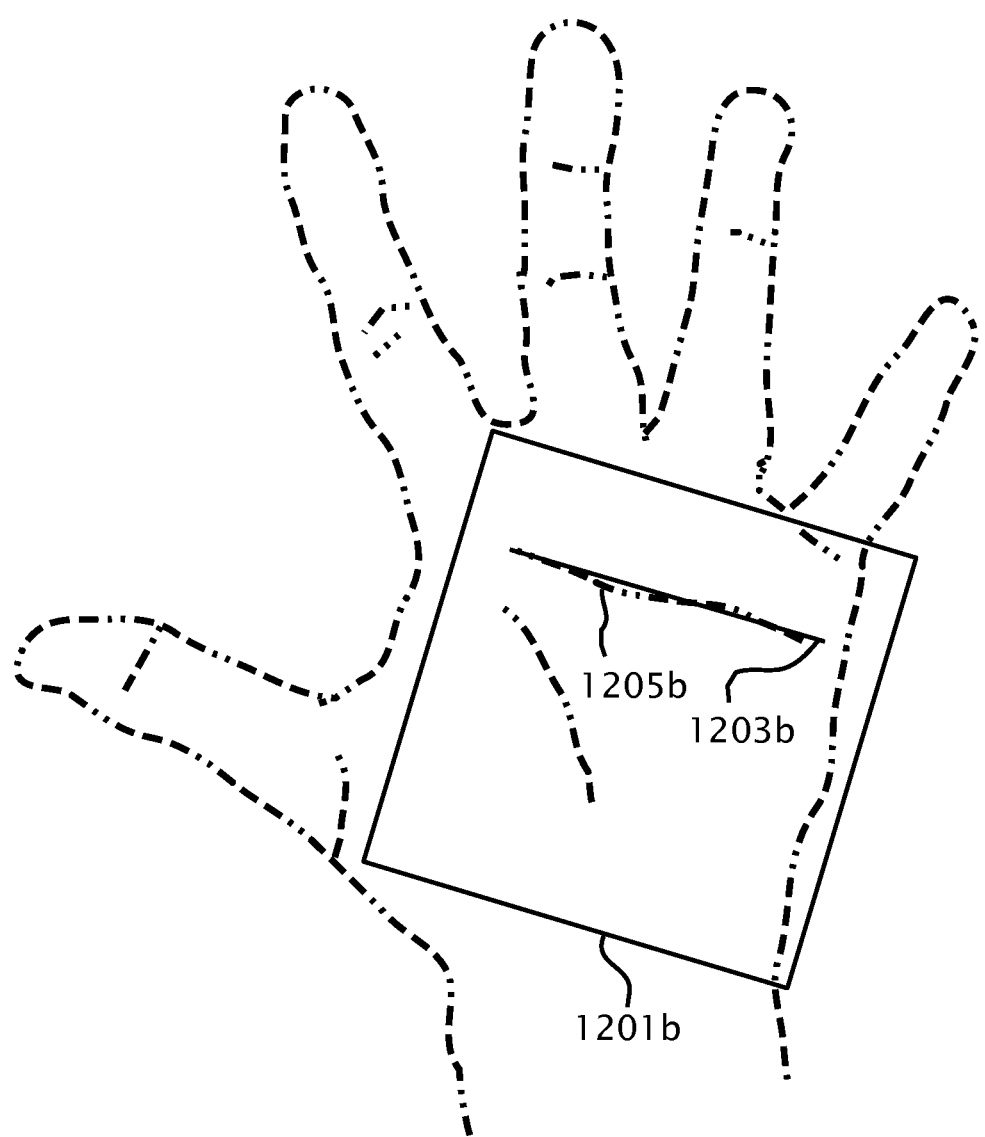
FIG. 14 shows a hand aligned with a display during enrollment and/or verification, according to features of the present invention.
Figure 15:
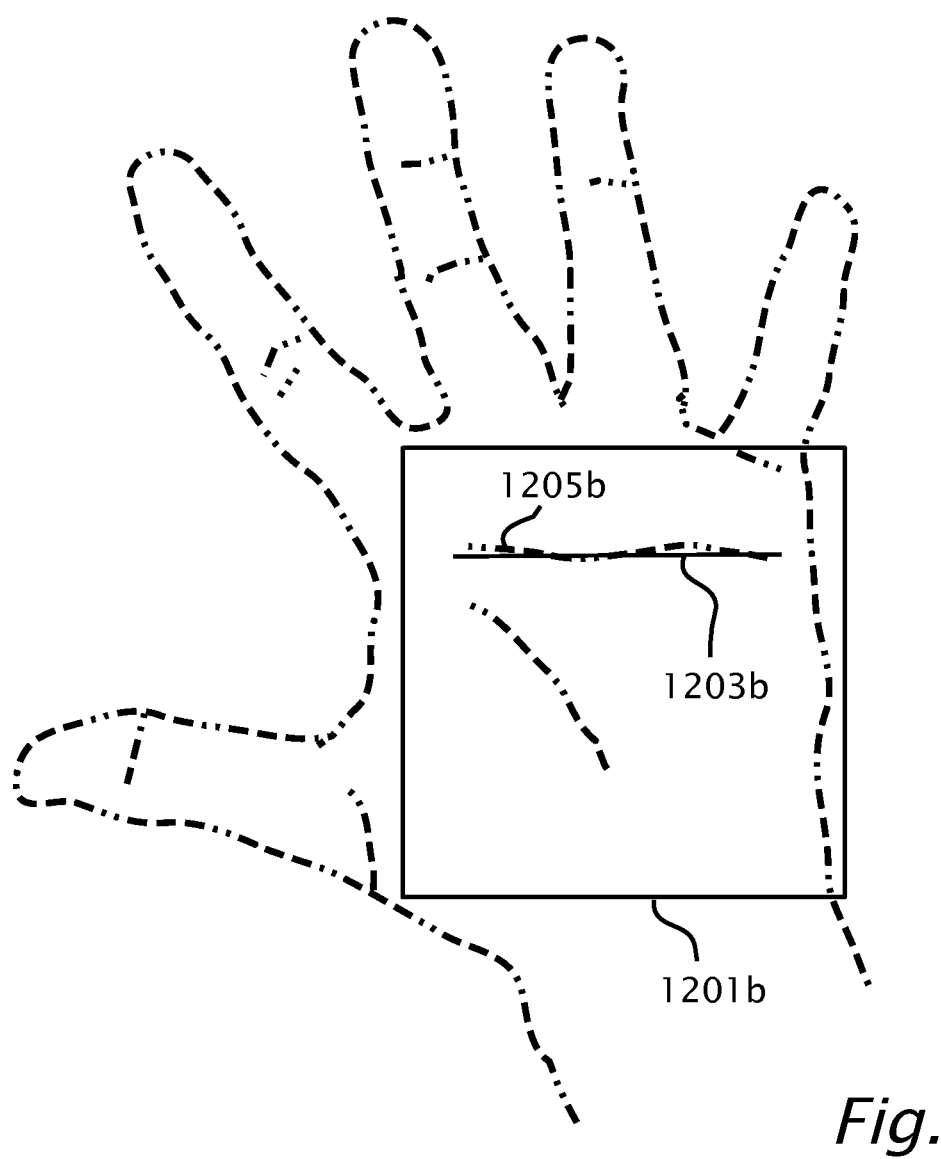
FIG. 15 shows a hand aligned with a display during enrollment and/or verification, according to different features of the present invention.

Referring back to method 1101, FIG. 11 in step 1105, enrollment images of a body part of the person are captured with camera 105. In step 1107, enrollment image of the person is presented to the person on display 109. The person is able to select (step 1109) a graticule scale 1201a-1201c, while enrollment images are superimposed with the selected graticule or scale 1201-1201c. Using graticule 1201b as the selected scale, the person may reposition or rotate selected graticule scale 1201b so that graticule line 1203b is positioned on line 1205b of the hand of the person as shown in FIG. 14. Alternatively, the person rotates and positions their hand so that graticule line 1203b is positioned on line 1205b of the hand of the person as shown in FIG. 15. Referring back to method 1101, FIG. 11, in step 1111 an enrollment image 20 of the body part of the person is stored along with selected graticule scale 1201b and associated with the enrolled person.

Authentication steps 1113-1123 are the steps which verify that a candidate person is or is not the person previously enrolled in steps 1101-1111. In step 1113, identification (ID) number of a candidate person may be received by mobile computer system 100.

The candidate person is instructed by system 100 to present a candidate body part to camera 105 so as to capture candidate images 40 of the candidate body part (step 1115).

The captured candidate images are presented (step 1117) superimposed on the selected enrollment scale. 1201. In step 1119, the candidate aligns one of the candidate images with selected enrollment scale 1201. In decision block 1121, if there is an alignment between candidate image 40 and selected scale 1201, then candidate image 40 may be verified or not verified as an authentic image of the candidate person as the previously enrolled person in step 1123. Otherwise in decision 1121 alignment by the candidate person may continue in step 1119 or after number of failed alignments, the candidate person is notified that an authentication of them was unsuccessful.

Further security features are involved in steps 1115 and 1117. In order to verify (step 317) candidate image 40 as an authentic image, candidate body part and features need to be identical to the body part and features used during enrollment. Moreover, selected scale 1201 has to be selected by the candidate person as that used during enrollment, to achieve verification that the candidate image is authentic.

During the enrollment processes shown above in FIGS. 13, 14 and 15, there may be no knowledge by mobile computer system 100 of the hand details (size etc) of a person to be enrolled. Therefore, in the enrollment stage, several graticule scales 1201 which have respective graticule lines 1203 may be displayed on display 109 and the person aligns their hand to each scale 1201. Hands can be aligned to scales 1201 where the whole hand should be placed inside a rectangular box of scale 1201.

Figure 13:
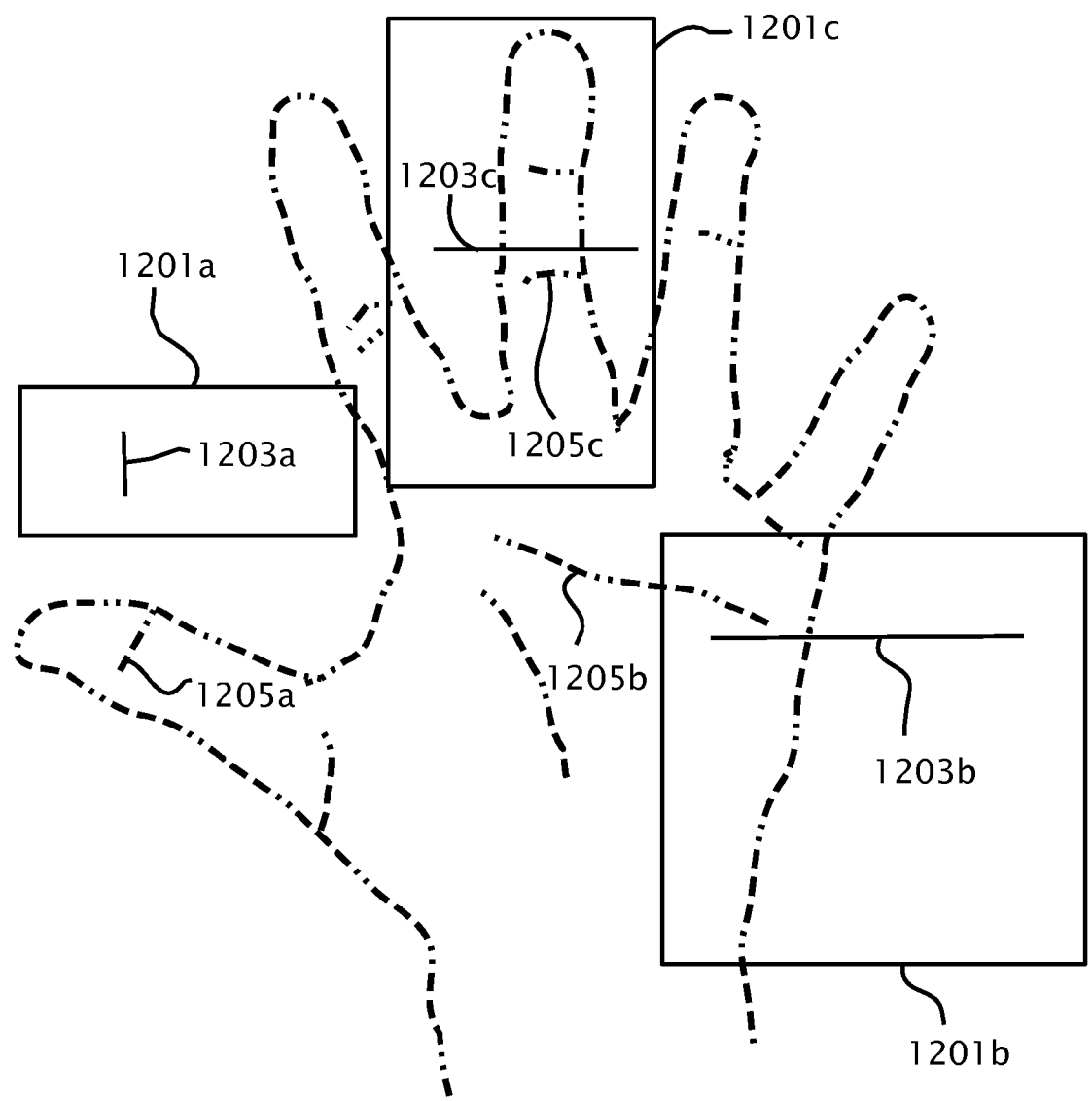
FIG. 13 shows a hand aligned during enrollment, according to a feature of the present invention.

Referring to FIG. 13, when the person aligns their hand on display 109 to each of the scales 1201 during enrollment, as a result, the hand may be actually placed at different distances to camera 105 for each of the scales 1201. Mobile computer system 100 may select the best scale 1201 for the user where the features extracted from enrollment image 20 related to corresponding scale 1201, are the most robust and distinct. From this point on the best selected scale 1201 may be used for the person and an enrollment image saved and used during verification.

Regarding the one of many verification process described above. The same enrollment mechanism may be used by any one of the verification process described above and a candidate person will have to select the required scale 1201 and place their hand according to their choice of hand placement. In the event of one too many attempted verifications of the candidate person, the candidate person may alternatively align their hand exactly as in the enrollment phase without presenting any information regarding their identity. The number of attempted verifications of the candidate person may now be limited only to related enrollees in the same scale and rotation and the user may be identified.

Using graticule 1201b as the selected scale, the person may reposition or rotate selected graticule scale 1201b so that graticule line 1203b is positioned on line 1205b of the hand of the person as shown in FIG. 14. Alternatively, the person rotates and positions their hand so that graticule line 1203b is positioned on line 1205b of the hand of the person as shown in FIG. 15. The alternatives presented by FIGS. 14 and 15 may apply to both the enrollment and verification processes or just to the enrollment process. In the verification process the scales 1201 may be predefined and unchangeable on display 109.

The process of verification may be repeated in a specific way. For example, during enrollment the user selects one of scales 1201a, 1201b, 1201c and aligns her hand to scale

1201. If verification is successful, the user continues to a second verification step with a different scale and so on. For a more secure option, the user during enrollment may combine scales 1201 in sequential verification steps and hence create a password from the ordered sequence of scales 1201. For example if there are 9 squares of the same size arranged like the iPhone® password screen. During verification the user may present the lines of one finger inside a specific square and then the lines of another finger at in a different specific square and so on. The combination of steps are saved in the enrollment phase and at each verification the user follows the same verification steps. Hence an imposter cannot predict the combination of finger placements and selections of squares in the order performed during enrollment.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise non-transitory physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a phone or Personal Digital Assistant "PDA") where internal modules (such as a memory and processor) work together to perform operations on electronic data. While any computer system may be mobile, the term "mobile computer system" especially includes laptop computers, notebook computers, cellular telephones, smart phones, wireless telephones, personal digital assistants, portable computers with touch sensitive screens and the like.

In this description and in the following claims, a "network" is defined as any architecture where two or more computer systems may exchange data. The term "network" may include wide area network, Internet local area network, Intranet, wireless networks such as "Wi-fi™", virtual private networks, mobile access network using access point name (APN) and Internet. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a transitory computer-readable medium. Thus, any such connection is properly termed a transitory computer-readable medium. Combinations of the above should also be included within the scope of transitory computer readable media and non-transitory computer-readable media. Computer-executable instructions comprise, for example, instructions and data which cause a general-purpose computer system or special-purpose computer system to perform a certain function or group of functions.

The term "server" as used herein refers to a computer system including a processor, data storage and a network adapter generally configured to provide a service over the computer network. A computer system which receives a service provided by the server may be known as a "client" computer system.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A computerized biometric method comprising enrollment and authentication of a person,
   wherein the authentication includes:
   presenting on a display a previously stored enrollment image to the person;
   instructing a candidate person to present a body part to a camera while the person is holding the body part unsupported in free space with respect to the camera, wherein said body part is of the candidate person;
   using the camera, capturing a times series candidate image of the body part while enabling aligning by the candidate person said candidate image with said previously stored enrollment image;
   upon said aligning, verifying said candidate image as an authentic image of said candidate person, thereby authenticating the candidate person as the person previously enrolled;
   wherein the enrollment includes:
   while a person is holding a body part unsupported in free space with respect to the camera, using the camera thereby first capturing said enrollment image of the body part and background thereof:
   wherein the authentication includes: said capturing said time series of said candidate images of said candidate body part and background thereof:
   during said capturing, presenting on a display said time series of candidate images superimposed on said enrollment image with the respective backgrounds thereof.

2. The computerized method of claim 1, wherein said previously stored enrollment image is generated independently from the person and the same enrollment image is displayed for said enrolling a plurality of previously unenrolled persons.

3. The computerized biometric method of claim 1, further comprising:
   prior to said authenticating, enrolling the person thereby selecting by the person said previously stored enrollment image from a plurality of previously stored enrollment images.

4. The computerized biometric method of claim 1, wherein said aligning includes spatial and angular alignment in image space and distance in real space between the hand and the display.

5. The computerized biometric method of claim 1, wherein said body part is a body part or portion thereof selected from a group consisting: at least a portion of a face, at least a portion of a hand, at least a portion of an ear, and at least a portion of an eye.

6. The computerized biometric method of claim 1, wherein said aligning is performed by instructing the candidate person to align a feature of the body part in said candidate images with a corresponding feature in said enrollment image.

7. The computerized biometric method of claim 6, wherein said feature and said corresponding feature are selected from a group consisting: a line, a ridge, a beauty mark, a scar, a mole, an area of differing skin pigmentation, a birth mark and a wrinkle.

8. The computerized biometric method of claim 1, further comprising:
performing said verifying by comparing said enrollment image with said authentication image.

9. The computerized biometric method of claim 1, wherein said aligning includes alignment in horizontal, vertical image coordinates, angular orientation in image space, and real space distance to camera.

10. The computerized biometric method of claim 1, further comprising:
prior to said presenting said previously stored enrollment image, processing said enrollment image by performing horizontal mirror inversion of said enrollment images.

11. A computerized biometric method comprising enrollment and authentication of a person,
wherein the authentication includes:
presenting on a display a previously stored enrollment image to the person;
instructing a candidate person to present a body part to a camera while the person is holding the body part unsupported in free space with respect to the camera, wherein said body part is of the candidate person;
using the camera, capturing a times series candidate image of the body part while enabling aligning by the candidate person said candidate image with said previously stored enrollment image;
upon said aligning, verifying said candidate image as an authentic image of said candidate person, thereby authenticating the candidate person as the person previously enrolled;
instructing the candidate person to align a feature of the body part in said candidate images with a corresponding feature in said enrollment image; and
upon the candidate person said aligning said feature of the body part in said candidate image with said corresponding feature in said enrollment image, said verifying at least one of said candidate images as an authentic image of said candidate person, thereby said authenticating the candidate person as the person previously enrolled by comparing said feature with the corresponding feature.

12. The computerized biometric method of claim 11, further comprising:
capturing a pre-enrollment image of a body part, while the person is holding the body part unsupported in free space with respect to the camera, wherein said body part is of the person;
presenting said pre-enrollment image to the person on a display;
upon presenting said pre-enrollment image, enabling the person to superimpose symbols with imaged features of the body part as presented on said display;
upon superimposing said symbols on said display with imaged features of the body part, storing as an enrollment image said symbols and respective positions and orientations in image space in said pre-enrollment image;
wherein the authenticating includes:
presenting on the display to a candidate person said enrollment image.

13. The computerized biometric method of claim 12, further comprising: prior to said superimposing at least one of the steps of:
relocating said symbols;
resizing said symbols; and
rotating said symbols.

14. The computerized biometric method of claim 12, wherein said presenting on said display to said candidate person said enrollment image includes presenting on said display said stored symbols and at least a portion of an image of said body part.

15. The computerized biometric method of claim 12, wherein said presenting on said display to said candidate person said enrollment image includes presenting said stored symbols without any portion of an image of said body part.

16. The computerized biometric method of claim 11, wherein the enrollment includes:
presenting on a display to the person, a plurality of previously defined enrollment scales;
enabling selecting at least one of the scales presented on said display to produce thereby a selected enrollment scale while enabling superimposing and repositioning of said at least one of said enrollment images with the selected scale;
storing said selected scale as at least one enrollment image;
wherein the authentication includes:
said presenting on a display said time series of said candidate images superimposed on said selected enrollment scale;
enabling aligning by said candidate person of at least one of said candidate images with said selected enrollment scale.

17. The computerized biometric method of claim 16, wherein during said authentication, said presenting said enrollment scale to the person includes said presenting a plurality of enrollment scales, the method further comprising:
selecting by the candidate person the selected enrollment scale.

18. A mobile computer system enabled to perform the computerized biometric method of claim 11, wherein the camera and the display are parts of the mobile computer system.

19. A non-transitory computer readable medium encoded with processing instructions for causing a processor to execute the method of claim 11.

* * * * *